(12) United States Patent
Vainikainen

(10) Patent No.: US 12,429,062 B2
(45) Date of Patent: Sep. 30, 2025

(54) PUMP ARRANGEMENT FOR PUMPING BARRIER LIQUID AND A MECHANICAL SHAFT SEAL

(71) Applicant: Sulzer Management AG, Winterthur (CH)

(72) Inventor: Jukka Vainikainen, Kotka (FI)

(73) Assignee: Sulzer Management AG, Winterthur (CH)

(*) Notice: Subject to any disclaimer, the term of this patent is extended or adjusted under 35 U.S.C. 154(b) by 0 days.

(21) Appl. No.: 17/765,336

(22) PCT Filed: Oct. 7, 2020

(86) PCT No.: PCT/EP2020/078162
§ 371 (c)(1),
(2) Date: Mar. 30, 2022

(87) PCT Pub. No.: WO2021/078519
PCT Pub. Date: Apr. 29, 2021

(65) Prior Publication Data
US 2022/0389935 A1     Dec. 8, 2022

(30) Foreign Application Priority Data
Oct. 21, 2019   (EP) .................................. 19204303

(51) Int. Cl.
*F04D 29/12*  (2006.01)
*F16J 15/34*  (2006.01)
*F16J 15/40*  (2006.01)

(52) U.S. Cl.
CPC ............ *F04D 29/128* (2013.01); *F16J 15/34* (2013.01); *F16J 15/406* (2013.01)

(58) Field of Classification Search
CPC .... F04D 29/126; F04D 29/128; F04D 29/108; F16J 15/34; F16J 15/406; F16J 15/3404; F16J 15/3412
USPC .................................................. 277/360, 408
See application file for complete search history.

(56) References Cited

U.S. PATENT DOCUMENTS

| | | | | | |
|---|---|---|---|---|---|
| 3,477,729 | A | * | 11/1969 | Hershey | F16J 15/3404 165/104.31 |
| 3,560,004 | A | * | 2/1971 | Donley | F04D 29/4273 277/408 |
| 3,692,373 | A | * | 9/1972 | Nichols | F16J 15/406 384/131 |
| 4,386,786 | A | * | 6/1983 | Agrama | F16J 15/004 277/411 |

(Continued)

FOREIGN PATENT DOCUMENTS

| CN | 102239352 A | 11/2011 |
|---|---|---|
| CN | 105673511 A | 6/2016 |

(Continued)

*Primary Examiner* — Wesley G Harris
(74) *Attorney, Agent, or Firm* — Global IP Counselors, LLP

(57) ABSTRACT

A pump arrangement for pumping barrier liquid in a sealed space of a mechanical shaft seal includes a housing assemblable in connection with a rotatable shaft of a device to be sealed by the mechanical shaft seal. The housing includes a pumping element, which is configured to be in force transmission connection with the rotatable shaft to provide power to operate the pumping element when in use.

11 Claims, 5 Drawing Sheets

(56) References Cited

U.S. PATENT DOCUMENTS

| | | | | |
|---|---|---|---|---|
| 5,238,253 A | * | 8/1993 | Sieghartner | F16J 15/3404 |
| | | | | 415/113 |
| 5,454,572 A | | 10/1995 | Pospisil | |
| 5,722,671 A | * | 3/1998 | Nosowicz | F16J 15/3404 |
| | | | | 277/408 |
| 6,210,103 B1 | * | 4/2001 | Ramsay | F16J 15/406 |
| | | | | 415/230 |
| 6,305,692 B1 | | 10/2001 | Arbeus | |
| 2019/0301454 A1 | | 10/2019 | Krampe et al. | |

FOREIGN PATENT DOCUMENTS

| | | | | |
|---|---|---|---|---|
| CN | 105864054 A | | 8/2016 | |
| CN | 109563933 A | | 4/2019 | |
| EP | 0388384 A1 | | 2/1990 | |
| FI | 113888 B | * | 6/2004 | ........... F04D 29/108 |
| GB | 2286020 A | * | 8/1995 | ........... F16J 15/3404 |
| GB | 2329432 A | * | 3/1999 | ........... F04D 29/128 |
| WO | WO-2006103467 A1 | * | 10/2006 | ........... F04D 29/106 |

* cited by examiner

PUMP ARRANGEMENT FOR PUMPING BARRIER LIQUID AND A MECHANICAL SHAFT SEAL

CROSS-REFERENCE TO RELATED APPLICATIONS

This application is a U.S. National Stage application of International Application No. PCT/EP2020/078162, filed Oct. 7, 2020, which claims priority to European Patent Application No. 19204303.2, filed Oct. 21, 2019, the contents of each of which are hereby incorporated by reference.

BACKGROUND

Field of the Invention

The present disclosure relates to a pump arrangement for pumping barrier liquid from a sealed space of a mechanical shaft seal.

The present disclosure also relates to a mechanical shaft seal comprising a stationary housing adapted to receive a rotatable shaft so as to define a barrier fluid cavity therebetween, and an inlet and an outlet for barrier fluid communicating with the barrier fluid cavity.

Background Information

There various types of conventional seals used for sealing a shaft of a flow machine, like a gland packing, a slide ring seal (also known as a mechanical seal) and a dynamic seal. The two first mentioned seal types are based on closing the gap via which a leakage can occur, whereas the operation of the dynamic seal is based on creating a pressure difference capable of preventing the leakage.

There are of two basic types of mechanical slide ring seals, i.e. a single mechanical seal (having a pair of slide rings) and a double mechanical seal (having two pairs of slide rings). When such a seal is applied to e.g. pumps, the single mechanical seal is normally used, for instance, when fibrous slurries up to 8% consistency are pumped. The seal can be used without barrier fluid, i.e. flushing water, when pump suction head is positive and the impeller is equipped with specific balancing holes. A double mechanical seal is applied to most demanding operating conditions, i.e. it can be used for sealing the shaft of a centrifugal pump used for pumping liquids and suspension in all consistencies and concentrations. In other words, pumping of clean, viscous, fibrous slurries, non-fibrous slurries and liquids containing large solids can be performed. The pump suction head can be negative or positive and the impeller can be equipped with or without balancing holes.

A double mechanical seal generally includes two seals arranged in series. The inboard, or primary seal, closer to the pump impeller keeps the medium to be pumped within the pump housing. The outboard, or secondary seal, arranged farther away from the pump impeller prevents the flush liquid or barrier fluid from leaking into the atmosphere.

Double mechanical seals are produced in two arrangements, i.e. so called back-to-back and face-to-face arrangements. In back-to-back arrangement the two rotating seal rings are arranged facing away from each other. The lubricating film is generated by the barrier fluid. This arrangement is commonly found in the chemical industry. In case of leakage, the barrier fluid penetrates the medium to be pumped. In face-to-face arrangement the rotary seal faces are arranged face to face and slide from the opposite direction to one or two stationary seal parts. This is a common choice, for instance, for the food industry, particularly for products which tend to stick. In case of leakage, the barrier fluid penetrates the medium to be pumped. If the product is considered "hot", the barrier fluid acts as a cooling agent for the mechanical seal.

In the general discussion above barrier liquid or fluid has been mentioned. The use of such liquid is vital for the operation of a double mechanical seal, as it, on the one hand, lubricates and cools the slide surfaces, and, on the other hand, prevents the medium to be pumped from entering between the slide surfaces. For ensuring the reliability of the double mechanical seal in the most demanding operating conditions emphasis has been put on the circulation of the barrier fluid. In other words, the barrier fluid is not only introduced in the cavity between the primary and the secondary seals, but an outlet arrangement has been provided for the barrier fluid, too. Such a liquid circulation is especially needed when the seal surfaces need to be cooled whereby the barrier fluid act as a heat transfer medium.

WO2017202592 A1 discloses a double mechanical seal used, for example, for sealing a shaft of a centrifugal pump. It is especially aimed at solving problems relating to the circulation of the barrier fluid, i.e. liquid used for lubricating the sealing surfaces. WO2017202592 A1 discloses in connection with the shaft a shaft sleeve which has axially extending grooves its outer surface and barrier fluid is pumped by the grooves of the shaft sleeve.

GB2297589 B discloses a pump including a double mechanical seal in which the barrier fluid of the seal is circulated by an external second pump which is driven by the pump shaft. The document also discloses that it has been proposed to avoid the necessity of using a second pump and motor by incorporating fins onto that part of the seal which is attached to the rotating shaft or otherwise modifying the shape of the seal cavity to as to allow flow to be induced by the rotation of the shaft. There is also disclosed that it has been found that such designs are do not generate enough positive pressure to effect a pressure differential across the seal faces. The document discloses double mechanical seal comprising a stationary housing adapted to receive a rotatable shaft so as to define a barrier fluid cavity therebetween, and an inlet and an outlet for barrier fluid communicating with the cavity. There is an auxiliary pump for circulating the barrier fluid. The auxiliary pump is driven by a continuous flexible drive element, one end of which passes around a driven wheel which provides drive to the gear pump and the other end of which passes around a driving wheel which takes drive from the rotatable shaft.

SUMMARY

It has been determined that although the above devices can be operable solutions as such it is technically complicated and consumes considerably space around the pump.

Therefore, object of the present disclosure is to disclose embodiments of a pump arrangement for pumping barrier liquid in a sealed space of a mechanical shaft seal, and a doubled mechanical shaft seal in which the barrier fluid flow is accomplished in a straightforward and space saving manner.

Objects of the present disclosure can be met substantially as is disclosed herein, which described more details of different embodiments of the invention.

According to an embodiment of the invention a pump arrangement for pumping barrier liquid in a sealed space of a mechanical shaft seal, comprising a housing assemblable in connection with a rotatable shaft of a device to be sealed by the mechanical shaft seal. The housing includes a pumping means (e.g., a pumping element), which is configured to be in force transmission connection with the rotatable shaft for providing power to operate the pumping element when in use. The pump arrangement comprises a force transmission projection comprising a wheel rotatably supported in the body, which is arranged to at least partly extend out from the housing, radially inwardly to the sealed space, such that the wheel is configured to be in force transmission connection with the rotatable shaft providing power to the pumping element.

According to an embodiment of the invention a pump arrangement for pumping barrier liquid from a sealed space of a mechanical shaft seal comprises a housing assemblable in connection with a rotatable shaft of a device to be sealed by the mechanical shaft seal, and the housing is provided with a barrier fluid duct, a pump space in fluid communication with the barrier fluid duct and/or the sealed space, and a pumping element arranged in the pump space.

According to an embodiment of the invention the housing comprises at least one inlet duct and at least outlet duct for the barrier liquid to be pumped, wherein the pumping element is arranged in connection with the at least one inlet or the at least outlet in the housing.

According to an embodiment of the invention the pumping element is arranged at the at least outlet duct in the housing.

According to an embodiment of the invention the pumping element is arranged at the at least inlet duct in the housing.

According to an embodiment of the invention the housing includes a pump space in connection with the barrier fluid duct, into which space the pumping element is arranged.

According to an embodiment of the invention the pump arrangement comprises a force transmission projection which is arranged to at least partly extend out from housing to the sealed space, such that the projection is configured to be in force transmission connection with the rotatable shaft providing power to the pumping element, when assembled in use.

According to an embodiment of the invention the force transmission projection is arranged to at least partly extend radially inside the sealed space in the housing through an opening in the pump space.

According to an embodiment of the invention the force transmission projection comprises a wheel rotatably supported in the body.

According to an embodiment of the invention the wheel comprises an impeller of the pumping element.

A mechanical seal according to an embodiment of the invention comprises a stationary housing adapted to receive a rotatable shaft so as to define between them a barrier fluid cavity as a sealed space, and an inlet and an outlet for barrier fluid communicating with the barrier fluid cavity. The mechanical seal further comprises an integrated barrier fluid pump arrangement for circulating the barrier fluid, arranged in the housing and in force transmission connection with the rotatable shaft, when installed for use.

According to an embodiment of the invention the mechanical seal comprises two pairs of seal rings having slide or seal surfaces, a first pair being formed of a primary stationary seal ring and a primary rotary seal ring, a second pair being formed of a secondary stationary seal ring and a secondary rotary seal ring wherein the sealed space of barrier fluid cavity is bordered by the two pairs of seal rings, and the force transmission connection of pumping element is arranged to extend radially through the primary stationary seal ring and/or the secondary stationary seal ring.

According to an embodiment of the invention the mechanical seal comprises a pump arrangement according to the various embodiments described herein.

The exemplary embodiments of the invention presented in this patent application are not to be interpreted to pose limitations to the applicability of the appended claims. The invention is applicable for use in centrifugal, or other types of pumps, agitators or mixers, turbines and other similar devices where a shaft is led through a seal between an inside and outside of the device. The verb "to comprise" is used in this patent application as an open limitation that does not exclude the existence of also unrecited features. The features recited in depending claims are mutually freely combinable unless otherwise explicitly stated. The novel features which are considered as characteristic of the invention are set forth in particular in the appended claims.

BRIEF DESCRIPTION OF THE FIGURES

The invention will be explained in more detail hereinafter with reference to the drawings.

DETAILED DESCRIPTION

Figure 1:
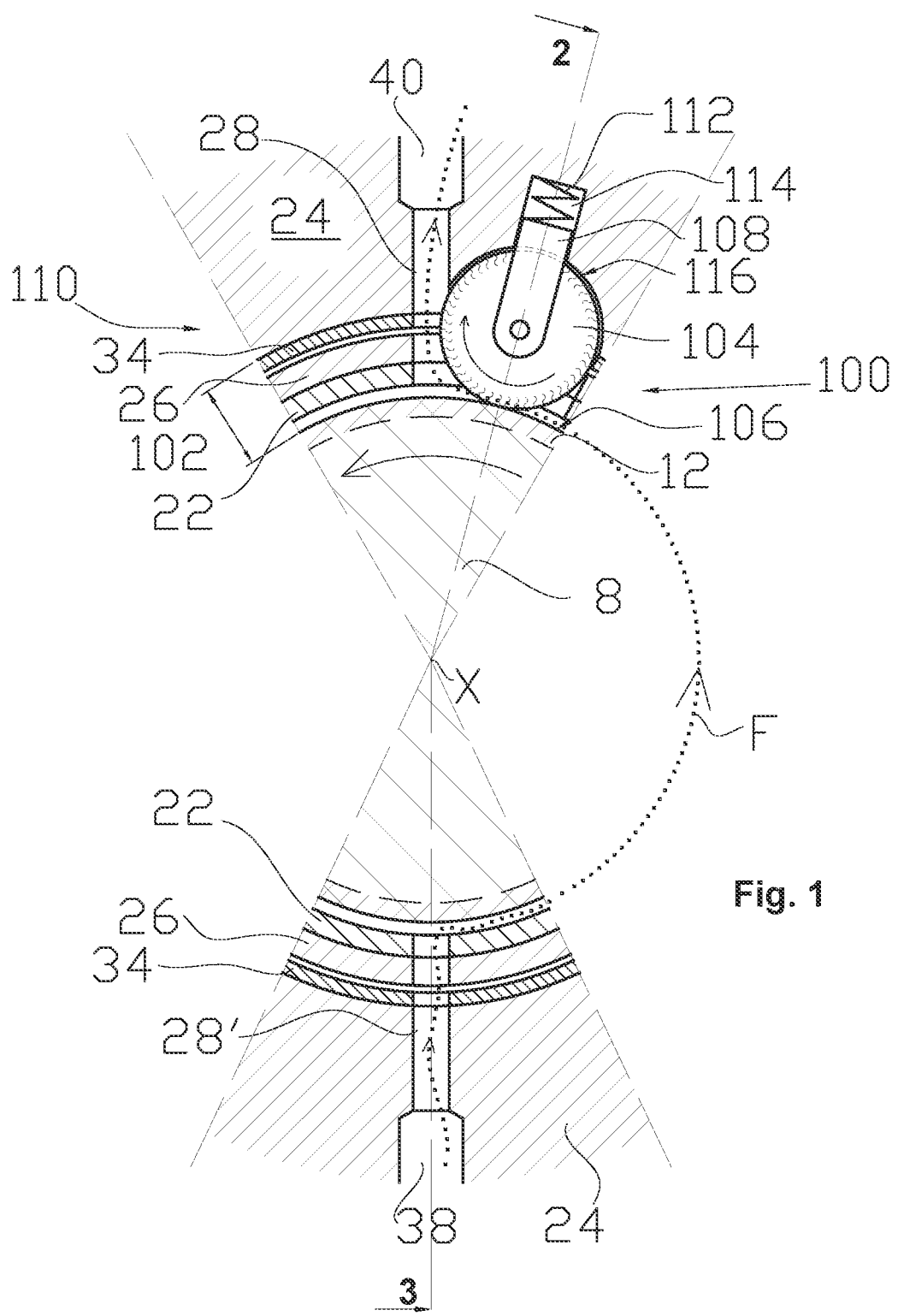
FIG. 1 illustrates a pump arrangement assembled in a mechanical shaft seal according to an embodiment of the invention.

The FIG. 1 depicts schematically a pump arrangement 100 assembled in a mechanical shaft seal, showing only two segments thereof. The pump arrangement 100 is configured for pumping barrier or flushing liquid in the mechanical shaft seal. The mechanical shaft seal comprises a stationary housing 110 adapted to receive a rotatable shaft 8 so as to define between them a barrier fluid cavity 102. The barrier fluid cavity 102 extends radially between the housing 110 and the shaft 8. The barrier fluid cavity 102 forms a sealed space of the mechanical shaft seal for the barrier fluid separated from the surrounding air and the sealed space is a more general expression of the barrier fluid cavity 102. As can be seen in the FIG. 1 there can be elements belonging to the housing 110 partly inside the barrier fluid cavity 102, such as seal rings 26, 34 or sections thereof, depending on the actual structure of the seal. In practice the housing can be constructed of more than one separate, possibly axially overlapping parts coupled with each other in sealed and stationary manner. The housing is provided with at least one barrier fluid duct 28,28' and the barrier fluid cavity 102 is in fluid communication with the barrier fluid duct or ducts 28,28'. The barrier fluid duct comprises at least one inlet duct 28' and at least one outlet duct 28, the inlet referring to fluid flow towards the cavity 102 and the outlet referring out from the cavity 102. The pump arrangement 100 comprises a pumping means (e.g., pumping element) 104, which is according to an embodiment of the invention an impeller wheel, which can also be referred to using the reference number 104. The pumping element 104 is arranged at least partly in the barrier fluid cavity 102, or in interaction with the barrier fluid in the cavity 102, such as the pumping element can cause a pumping effect to the barrier fluid when rotating. The housing 110 includes a pump space 116 which is in fluid communication with the barrier fluid duct 28,28' and/or the barrier fluid cavity 102. The pump space 116 is formed such that impeller wheel can be installed into the space 116 e.g. from radially inside the housing. It is also conceivable that the housing is an assembly of separate parts and the impeller wheel is arranged between at least two removably assembled parts of the housing.

The impeller wheel 104 refers to a wheel which can have specific blades for improving the pumping effect but the wheel can comprise suitable patterned, or in some cases even flat surface to accomplish such effect to the barrier fluid at least to some extent. The pumping element 104 is configured to be in force transmission connection with the rotatable shaft 8 which provides driving power to the pumping element when in use. Particularly as is shown in the FIG. 1 the impeller wheel is in direct force transmission with the shaft 8. The pumping element comprises a force transmission projection out from the housing stationary 110, which at least partly extend radially from the housing towards the barrier fluid cavity 102, such that the projection is configured to be in force transmission connection with the rotatable shaft 8 providing power to the pumping element, when assembled in use, through an opening between the barrier fluid cavity 102 and pump cavity. In other words, the pumping element obtains the power needed to operate it from the shaft. As is depicted in FIG. 1 the shaft the seal optionally comprises a shaft sleeve 12 which is removably attached to the shaft and in which case the pumping element 104 is in force transmission connection with the shaft sleeve 12. The force transmission projection extends towards the center X of the housing such that shortest distance from the force transmission projection to the center of the housing is smaller than the radius of a sealed space in the housing. The impeller wheel 104 can comprise separate axial section for power transmission and a separate axial section for pumping.

In the embodiment of the invention shown in FIG. 1 the impeller wheel 104 is in direct connection with the shaft 8, or the shaft sleeve 12, should the mechanical shaft seal include one. In the embodiment in which the mechanical shaft seal is a so called cartridge seal of, for example, a pump shaft, a separate sleeve 12 is assembled on the shaft 8. There is a drive surface 106 arranged on the shaft 8 or the shaft sleeve 12 at the axial location where the pumping means 104 is positioned. The drive surface 106 is configured to enhance the force transmission connection from the shaft 8 or the shaft sleeve 12 to the pumping element. The pumping element can be made of metal or for example of suitable composite material. The pumping element has a radial edge or rim, which is arranged to cooperate with the drive surface 106. The drive surface 106 and/or the radial edge of the pumping means can comprise for example an O-ring attached to a groove on its surface (not shown), a rubber sleeve or surface, a suitable friction increasing coating etc. Even if not shown, optionally the pumping element 104 can be coupled with the shaft 8 or the shaft sleeve 12 in force transmission by providing a gear transmission to the drive surface 106 and the pumping element 104. In that case the drive surface 106 includes teeth meshing with teeth arranged to the impeller wheel 104.

There is an inlet 38 and an outlet 40 in the barrier fluid duct 28,28' for barrier fluid communicating with the cavity 102. When the pump arrangement 100 is operated the barrier fluid is caused to flow as from the inlet 38 to the barrier fluid inlet duct 28' and further to the cavity 102 from which the pumping element 104 transfers the barrier fluid to the barrier fluid outlet duct 28 and finally to the outlet 40. The mechanical shaft seal further comprising a pumping element for circulating the barrier fluid arranged in the housing, and in force transmission connection with the rotatable shaft, when installed for use.

FIG. 1 is a cross sectional view, in which the inner part in respect to a center X, which denotes a longitudinal axis perpendicular to the view of the FIG. 1, is a shaft 8. The housing 110 comprises a shaft space such that the housing is assemblable to circumscribe a rotatable shaft 8 of a device to be sealed. The inlet 38 for leading the barrier fluid into the cavity 102 extends from exterior of the housing to the pump arrangement 100, and at least one outlet 40 for leading barrier fluid from the pump 100, extending from the pump to exterior of the housing. As is shown in FIG. 1 in this embodiment the pumping element 104 is arranged at the at least one outlet duct 28 of the housing. Even if not shown in FIG. 1, if the direction of rotation of the shaft 8 is opposite to that shown in FIG. 1, also the flow direction of the barrier fluid is opposite to what is shown. In that case the inlet 38 becomes an outlet, and the outlet 40 becomes an inlet. Thus, the pumping element 104 is then at the inlet duct 28 of the housing 110.

Figure 5:
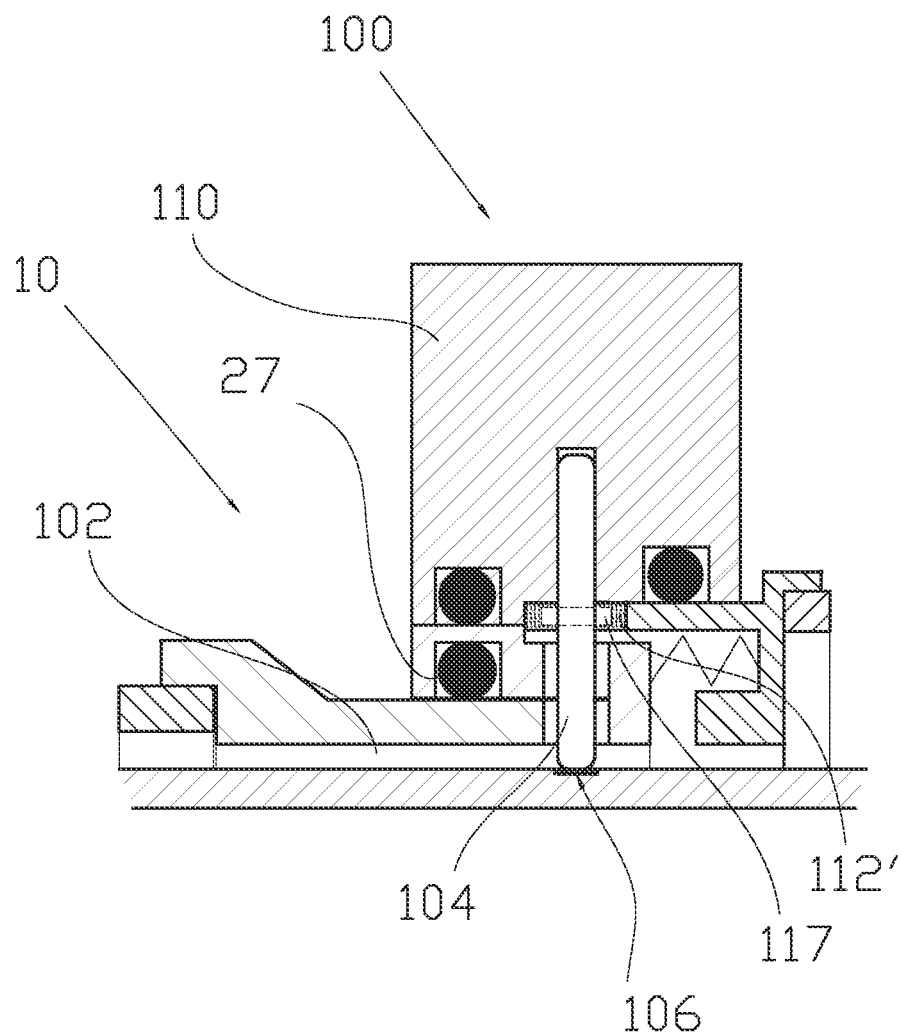
FIG. 5 illustrates another embodiment of a pump arrangement according to the present disclosure.

The impeller wheel 104 is rotatably supported to a guide pin 108 for which the housing 110 includes an elongated guiding space 114. The impeller wheel is attached to a first end of the guide pin 108 while the second end of the guide pin 108 extends into the elongated space. There is a spring element 112 or alike arranged between and end of the elongated space and the guide pin 108 which urges the guide pin 108 and the impeller wheel 104 radially inwardly from the housing 110. The spring element 112 can be for example an ordinary helical spring or an elastic piece of other material, such as rubber or alike. It is also conceivable, as is shown in the FIG. 5, that the spring element 112' comprises an elastic support member 112' on which a shaft 117 of the impeller wheel is attached to, so as to elastically support the wheel 104 to the stationary housing 110. In this case the arrangement also the guide pin can be omitted.

Figure 2:
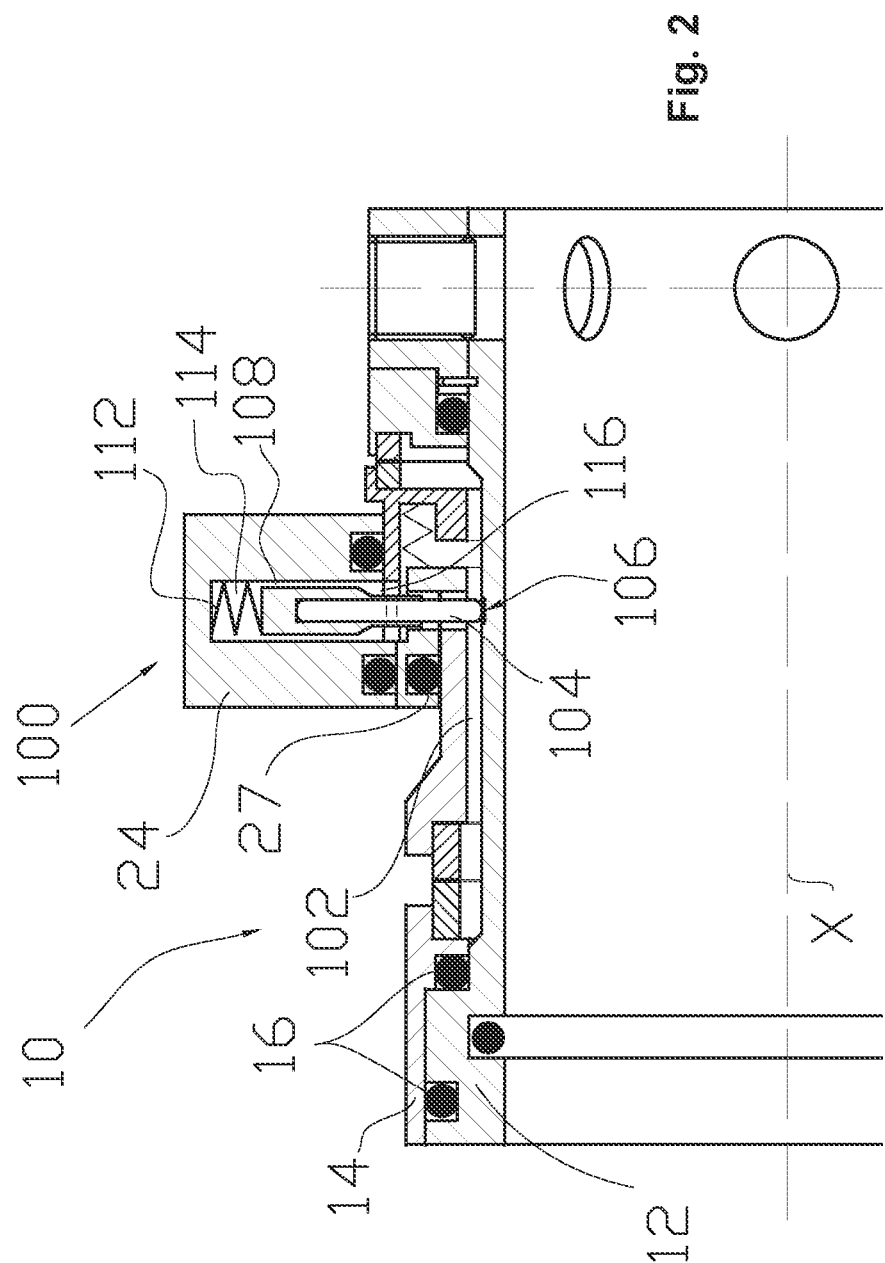
FIGS. 2 and 3 illustrates a sectional view of a mechanical shaft seal according to an embodiment of the invention.
Figure 3:
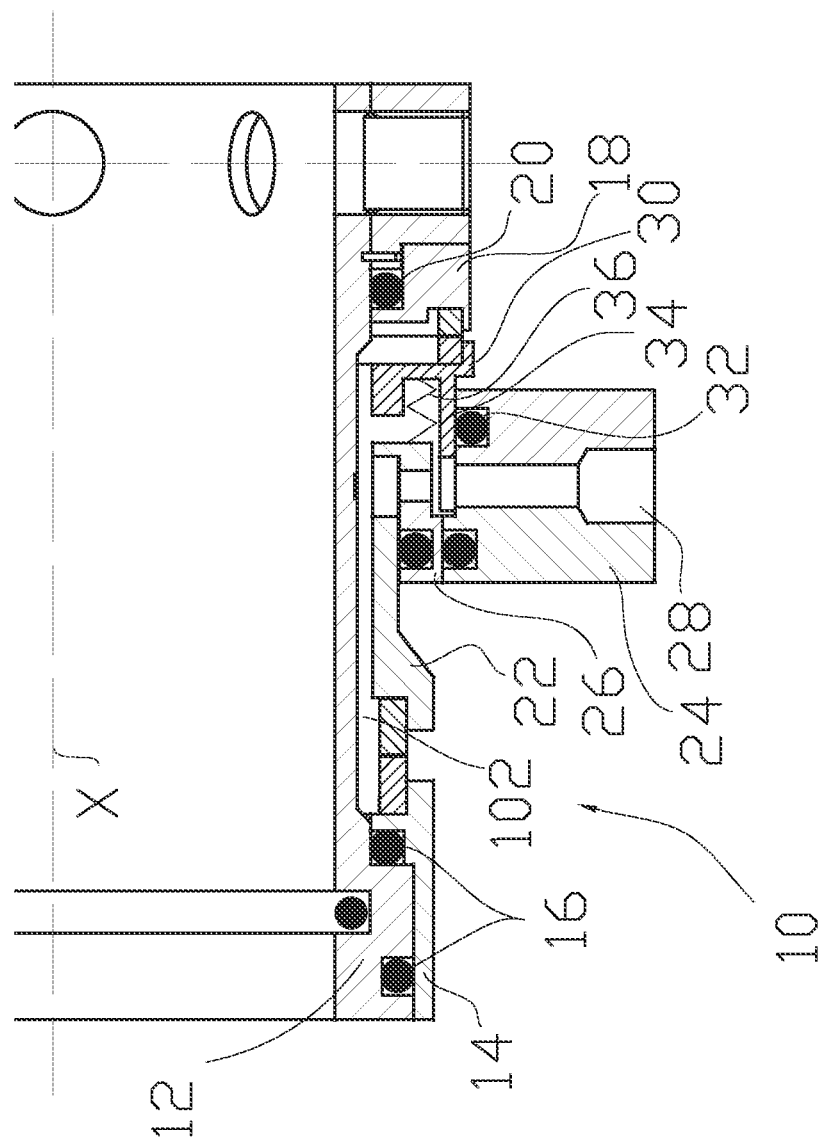

FIG. 2 illustrates schematically a first radial half-section of cut-out 2-3 in FIG. 1 applied to a double mechanical shaft seal 10 including an integrated barrier fluid pump arrangement 100 and FIG. 3 illustrates schematically a second radial half-section of cut-out 2-3 applied to a double mechanical shaft seal 10 including an integrated barrier fluid pump arrangement 100 in accordance with an embodiment of the present invention.

The barrier fluid pump arrangement 100 is particularly advantageous in a double mechanical shaft seal in which two pairs of seal rings borders the barrier fluid cavity 102 is bordered by the two pairs of seal rings, and the force transmission connection of pump arrangement 100 is arranged to extend radially through the primary stationary seal ring and/or the secondary stationary seal ring which serve as or constitute the housing 110 of the seal.

Referring to FIGS. 2 and 3 the double mechanical shaft seal 10 is shown in connection with a shaft sleeve 12 that is to be arranged on a shaft such that it rotates together with the shaft. The double mechanical shaft seal has an axis X, and the double mechanical shaft seal 10 is coaxial with both the shaft sleeve 12 and the actual shaft on which the double mechanical shaft seal 10 is intended to be fitted. However, the double mechanical shaft seal 10 of embodiments of the present invention could as well be used or installed directly on the rotary shaft, without the separate shaft sleeve 12 with suitable modifications to rotary seal rings. The double mechanical shaft seal 10 comprises a primary rotary seal ring 14 that is supported, in this embodiment, on the shaft sleeve 12 by O-rings 16 and a secondary rotary seal ring 18 supported on the shaft sleeve 12 by an O-ring 20. The mechanical shaft seal 10 further comprises a primary stationary seal ring 22 supported to a seal gland 24, which is part of the housing 100 referred to in the FIG. 1. The primary stationary seal ring 22 is supported to the seal gland 24 in the FIGS. 2 and 3 via a pressure ring 26, the pressure ring 26 supporting the primary stationary seal ring 22 from outside, for instance, by means of an O-ring 28. The pressure ring 26 has an axis coinciding with the axis X of the double mechanical shaft seal. The pressure ring 26 is, on its part, supported from outside to the seal gland 24 by an O-ring. The seal gland 24 comprises a barrier fluid outlet duct 28'. Naturally, the seal gland 24 is also provided with an inlet duct 28 in addition to the outlet duct 28' for the barrier fluid. The double mechanical shaft seal 10 comprises further a secondary stationary seal ring 30 supported directly to the seal gland 30 via an O-ring 32. The secondary stationary seal ring 30 has a carrier ring 34, which extends in axial direction to be radially between the pressure ring 26 and the seal gland 24. The carrier ring 34 can extend in front of the barrier fluid outlet opening such that the carrier ring 34 or the rim thereof includes an opening or recess for enabling the flow of the barrier fluid into the outlet duct 28. The stationary nature of the primary and secondary stationary seal rings 22, 30 is, for instance, ensured by at least one drive pin (not shown) or a corresponding fixed or removable element extending from the seal gland 24 to at least one of the stationary seal rings 20, 30. However, both stationary seal rings can have, for instance, tooth-like projections mating to one another such that it is sufficient to have only one of the stationary seal rings, i.e. in FIGS. 2 and 3 the secondary stationary seal ring, including the drive pin, the tooth like projections preventing the other stationary seal ring from rotating. Thus, the secondary stationary seal ring 30 has at least one recess or opening for the drive pin or alike in or in the vicinity of its rim opposite the rim having the seal surface. And finally, a spring or a set of springs (depending on the spring type) 36 is arranged between the primary and secondary stationary seal rings 22, 30 to push the stationary seal rings 22, 30 towards the rotary seal rings 14, 18 such that the seal surfaces are in constant contact with one another. The spring/s 36 can be either in direct communication with the stationary seal rings, or by some other element, like, for instance, by the pressure ring 26 as shown in FIGS. 2 and 3. The seal cartridge having a double mechanical shaft seal is, when the seal is taken in use in a pump, fastened to the end of the pump housing using bolts extending through the seal gland 24.

The housing 110 in the mechanical shaft seal shown in FIGS. 2 and 3 comprises the stationary parts of the seal and the housing is constructed of more than one separate parts coupled with each other in sealed and stationary manner. The barrier fluid cavity 102 is formed between the sleeve 12 and the seal rings of the seal. The gland 24 of the seal includes the barrier fluid inlet duct 28, which is shown in FIG. 3. FIG. 2 in turn discloses a projection of the pump arrangement 100 supported to the gland 24 by the guide pin 108 as is described in connection with FIG. 1.

Figure 4:
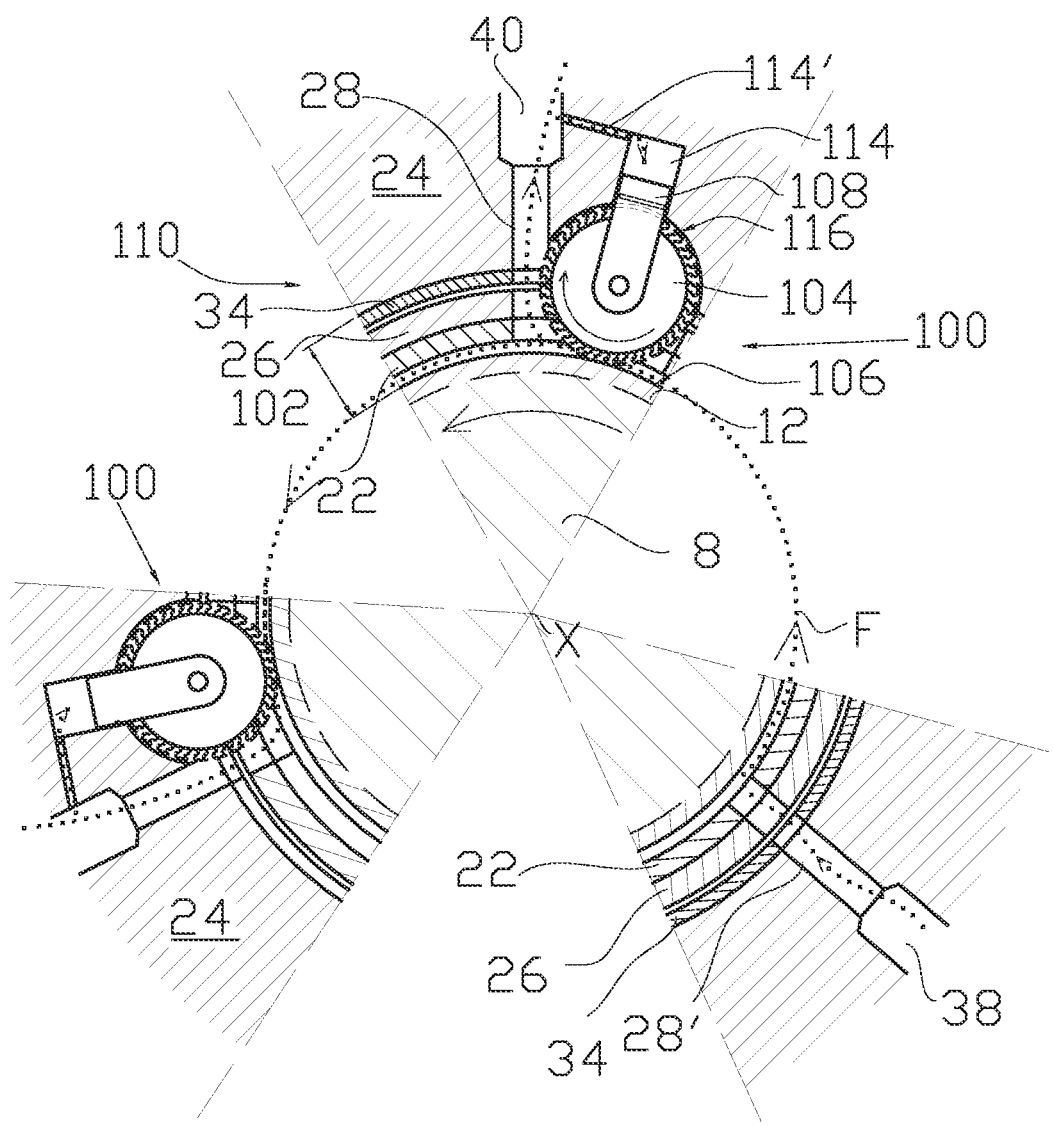
FIG. 4 illustrates a pump arrangement assembled in a mechanical shaft seal depicting other embodiments of the invention.

FIG. 4 discloses an embodiment of the invention where more than one pump arrangements 100 are provided in the housing 24. This way the pumping capacity can be increased compared to only one pump arrangement. Even if the pumping arrangements in FIG. 4 are different that shown in FIGS. 1 and 2 it is naturally applicable to use several the pump arrangements shown in FIGS. 1 and 2 in the mechanical shaft seal. The pump arrangement shown in FIG. 4 differs from that shown in FIGS. 1 and 2 such that spring element 112 is replaced by hydraulic cylinder. There is a conduit 114' which connects the barrier fluid duct 28 to the end of the elongated space such that the pressure of the barrier fluid is applied to the end of the guide pin 108. This in turn urges the wheel 104 against the drive surface 106. In FIG. 4 the impeller wheel is shown in include blades or paddles at its radial rim.

While embodiments of the invention have been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above can be used in connection with another embodiment when such combination is technically feasible.

The invention claimed is:

1. A pump arrangement for pumping barrier fluid in a sealed space of a mechanical shaft seal, comprising:
   a housing assemblable in connection with a rotatable shaft of a device to be sealed by the mechanical shaft seal; and
   an impeller arranged in the housing and rotatably supported by a shaft of the impeller to the housing, the impeller comprising a wheel arranged to at least partly extend radially inwardly out from the housing to the sealed space, such that a radial outer surface of the wheel is disposed against and in force transmission connection with an outer surface of the rotatable shaft of the device to provide power to the impeller, and rotate the impeller in an opposite direction to the direction of rotation of the rotatable shaft of the device.

2. The pump arrangement according to claim 1, wherein the housing includes a barrier fluid duct, a pump space in fluid communication with the barrier fluid duct or the sealed space, the wheel of the impeller arranged in the pump space.

3. The pump arrangement according to claim 2, wherein the impeller is arranged in the pump space.

4. The pump arrangement according to claim 3, wherein the wheel is arranged to at least partly extend radially inside the sealed space in the housing through an opening in the pump space.

5. A mechanical shaft seal comprising:
   the pump arrangement according to claim 4;
   the housing configured to receive the rotatable shaft so as to define a barrier fluid cavity therebetween as the sealed space, and the barrier fluid duct includes an inlet and an outlet for the barrier fluid communicating with the barrier fluid cavity; and
   the pump arrangement configured to circulate the barrier fluid, arranged in the housing and in force transmission connection with the rotatable shaft.

6. A mechanical shaft seal comprising:
   the pump arrangement according to claim 3;
   the housing configured to receive the rotatable shaft so as to define a barrier fluid cavity therebetween as the sealed space, and the barrier fluid duct includes an inlet and an outlet for the barrier fluid communicating with the barrier fluid cavity; and
   the pump arrangement configured to circulate the barrier fluid, arranged in the housing and in force transmission connection with the rotatable shaft.

7. A mechanical shaft seal comprising:

the pump arrangement according to claim 2;

the housing configured to receive the rotatable shaft so as to define a barrier fluid cavity therebetween as the sealed space, and the barrier fluid duct includes an inlet and an outlet for the barrier fluid communicating with the barrier fluid cavity; and the pump arrangement configured to circulate the barrier fluid, arranged in the housing and in force transmission connection with the rotatable shaft.

8. The pump arrangement according to claim 1, wherein the housing comprises at least one inlet duct and at least one outlet duct for the barrier fluid to be pumped, the wheel of the impeller arranged in connection with the at least one inlet duct or the at least one outlet duct in the housing.

9. A mechanical shaft seal comprising:

the pump arrangement according to claim 8;

the housing configured to receive the rotatable shaft so as to define a barrier fluid cavity therebetween as the sealed space and a barrier fluid duct, and the barrier fluid duct includes an inlet and an outlet for the barrier fluid communicating with the barrier fluid cavity; and the pump arrangement configured to circulate the barrier fluid, arranged in the housing and in force transmission connection with the rotatable shaft.

10. A mechanical shaft seal comprising:

the pump arrangement according to claim 1;

the housing configured to receive the rotatable shaft so as to define a barrier fluid cavity therebetween as the sealed space, and an inlet and an outlet for the barrier fluid communicating with the barrier fluid cavity; and the pump arrangement configured to circulate the barrier fluid, arranged in the housing and in force transmission connection with the rotatable shaft.

11. The mechanical shaft seal according to claim 10, further comprising two pairs of seal rings having slide or seal surfaces, a first pair of the two pairs of seal rings being formed of a primary stationary seal ring and a primary rotary seal ring, a second pair of the two pairs of seal rings being formed of a secondary stationary seal ring and a secondary rotary seal ring, the barrier fluid cavity bordered by the two pairs of seal rings, and the force transmission connection of the wheel being arranged to extend radially through the primary stationary seal ring or the secondary stationary seal ring.

\* \* \* \* \*